United States Patent [19]

Hill et al.

[11] Patent Number: 4,743,910
[45] Date of Patent: May 10, 1988

[54] FREQUENCY DOMAIN, PULSE COMPRESSION RADAR APPARATUS FOR ELIMINATING CLUTTER

[75] Inventors: Richard M. Hill, La Habra; Richard D. Parton, Fullerton; James H. Sawyers, Santa Ana, all of Calif.

[73] Assignee: Hughes Aircraft Company, Los Angeles, Calif.

[21] Appl. No.: 943,275

[22] Filed: Dec. 16, 1986

[51] Int. Cl.[4] .............................................. G01S 13/28
[52] U.S. Cl. ...................................... 342/159; 342/201
[58] Field of Search ............... 342/201, 203, 159, 128, 342/132

[56] References Cited

U.S. PATENT DOCUMENTS 4,042,925 8/1977 Albanese et al. .................... 342/132
4,270,209 5/1981 Albanese ............................. 364/485

Primary Examiner—Theodore M. Blum
Assistant Examiner—Donald E. Hayes, Jr.
Attorney, Agent, or Firm—A. W. Karambelas

[57] ABSTRACT

Frequency domain, pulse compression CW radar apparatus comprises a frequency synthesizer which provides RF and IF CW signals and linear frequency modulator (LFM) which provides a saw tooth LFM ramp signal with the $f_{LFM}$. A mixer combines the $f_{LFM}$ signal with the $f_{RF}$ signal to provide a CW radar signal having a frequency, $(f_{RF}+f_{LFM})$ for transmitting by a transmitter. A receiver receives time-delayed CW radar return signals reflected, for example, from clutter at a one range and from a target at another range. A second mixer down-converts the clutter and target return signals to an intermediate frequency for processing and a third mixer extracts the $f_{LFM}$ signal from the intermediate frequency clutter and target return signals to provide, in a frequency-time domain, rectangular wave, clutter and target signals. A time gate and a frequency notch filter are connected for receiving these rectangular wave signals, the notch filter having at least one frequency notch for filtering out the clutter signal while passing the target signal, assuming the frequency characteristics of the clutter and target signals are different from one another. A synchronization detector provides in phase (I) and quadrature (Q) components of the remaining target signal; an A/D converter and sampler digitizes and samples the I and Q signal components, the samples being sequentially processed in a FFT digital pulse compressor and in a FFT doppler processor to provide conventional range and doppler cell information.

20 Claims, 6 Drawing Sheets

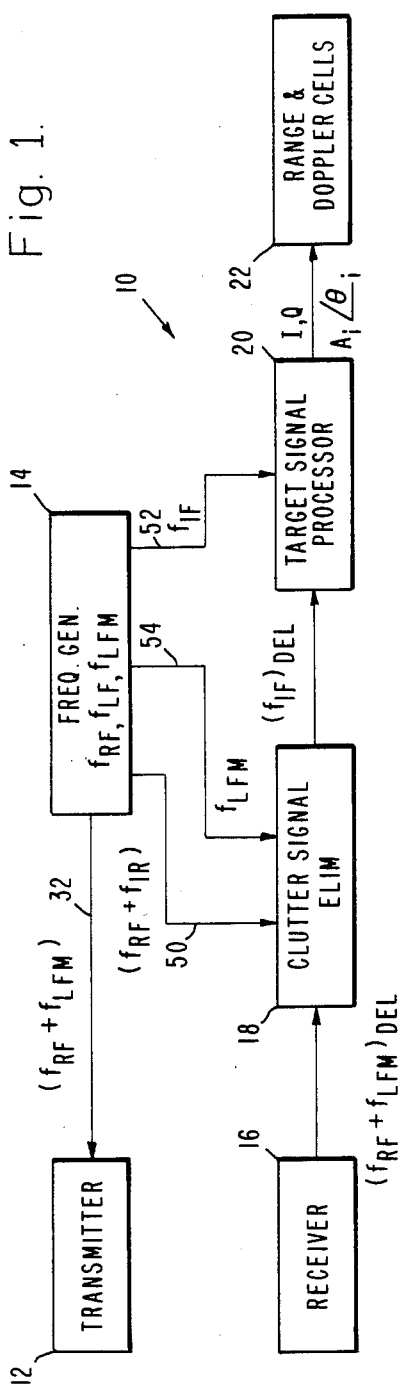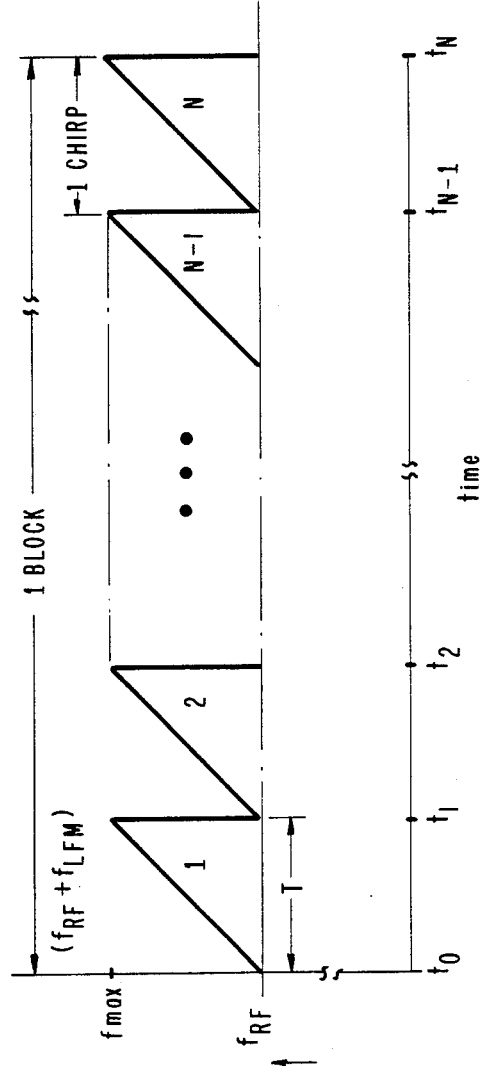

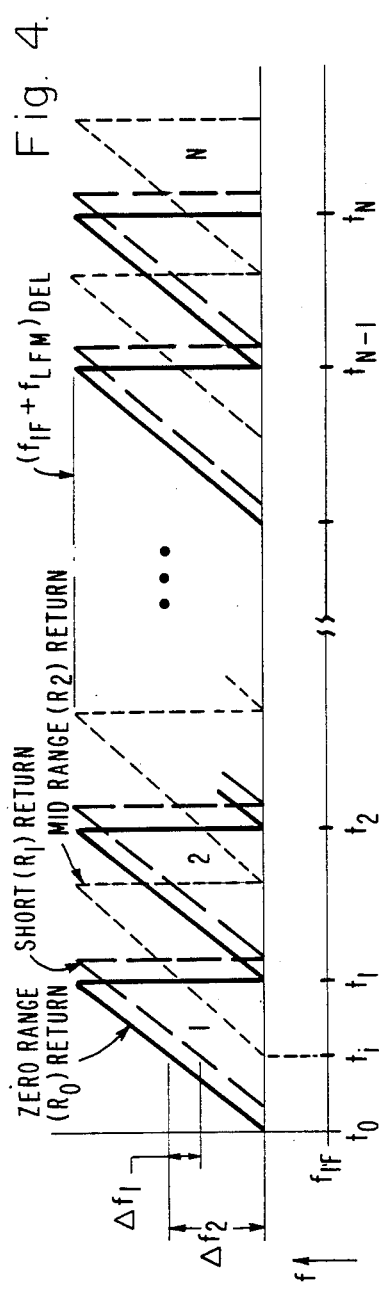
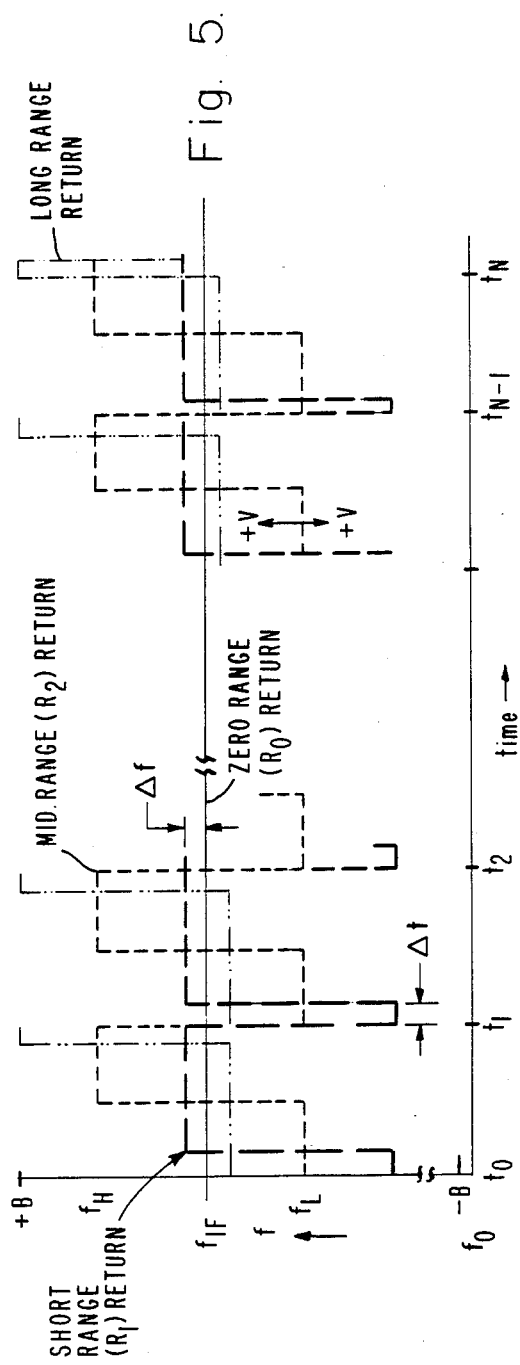

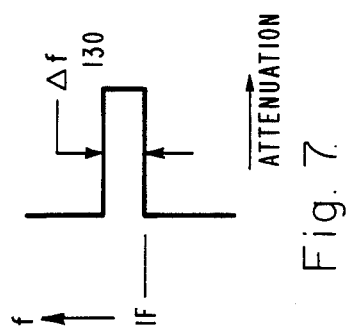
Fig. 7.
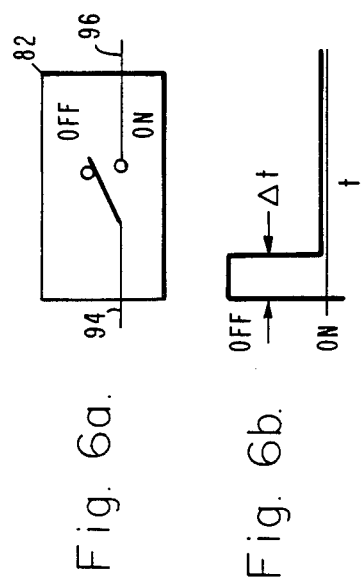
Fig. 6a.
Fig. 6b.
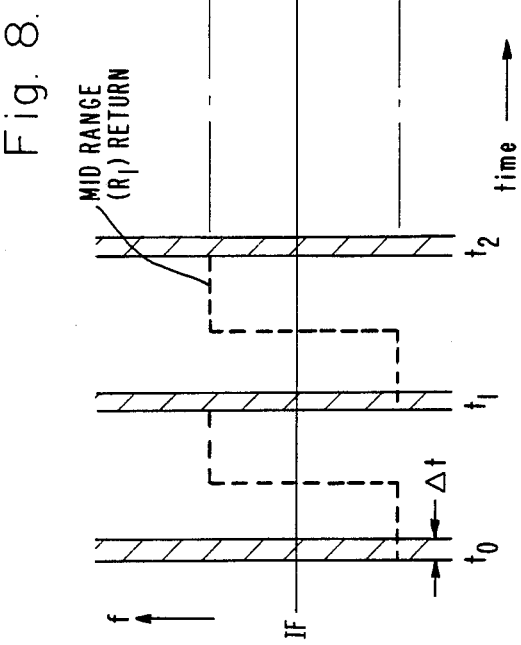
Fig. 8.

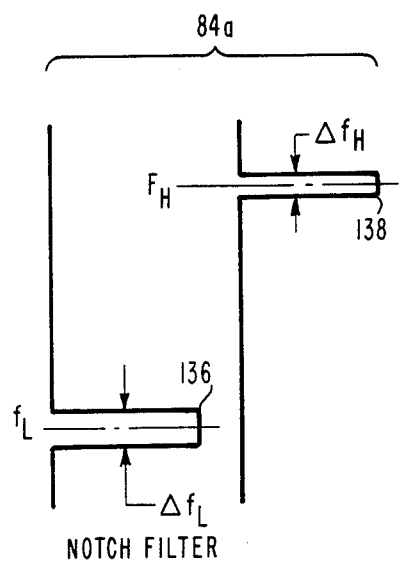
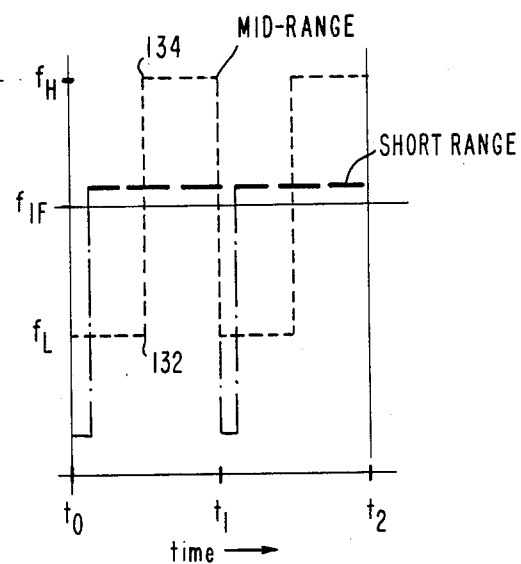

FREQUENCY DOMAIN, PULSE COMPRESSION RADAR APPARATUS FOR ELIMINATING CLUTTER

BACKGROUND OF THE INVENTION

1. Field of the Invention

The present invention relates generally to the field of radars and more particularly to the field of CW (continuous wave) radars configured for target range detection.

2. Background Discussion

Radars are generally known as active electronic apparatus which detect objects by radiating microwave energy, in the form of electromagnetic waves, and by processing return signals from reflecting objects. A widely held conception is that radars transmit short bursts of energy and measure the round trip time of the pulses to a target object and back to a receiver, the target range being computed from the round trip pulse time and the known velovity of wave propagation.

Typically pulsed radars generate a train of short pulses, the length of each pulse in the train typically being only a few microseconds and the pulse repetition frequency (PRF) being typically several hundred pulses per second. Each pulse consists of a packet or burst of an RF wave having a typical frequency in the high megahertz to gigahertz range. Target velocity and/or closing rate may also be determined by pulsed radars by examining the doppler frequency shift in the reflected wave caused by target movement, such radars being called pulsed doppler radars.

As an alternative to pulsed doppler radars for some applications, particularly for ground based low altitude surveillance in a military environment, narrow bandwith CW (continuous wave) radars may, because of advantages in target visibility, be used. Unlike pulsed radars, CW radars, in their simplest form, transmit a single sinusoidal wave, the time-delayed, received signals being mixed with the transmitted carrier frequency.

However, with advances in digital signal processing techniques, weapons requirements and Low Probability of Interference (LPI) radar technologies, wide bandwidth (high resolution), frequency agile, track-while-scan ground surveillance radars must be developed. Current CW radars use RF/IF cancellation techniques to reject transmitter-receiver signal leakage and short range clutter return signals. Although CW radars using pure CW waveforms exhibit excellent leakage/clutter immunity, such radars cannot measure target range. To provide target range measurement capability, some form of phase or frequency modulation must be imparted to the transmit waveform. In general, the range resolution improves with the bandwidth of such modulations, while the susceptibilty of the radar to leakage/clutter increases with modulation bandwidth. Conventional leakage/clutter cancellation or rejection techniques are not applicable to wide bandwidth signals. Improvements are, therefore, needed in wide bandwidth techniques that are compatible with high performance CW surveillance radars.

SUMMARY OF THE INVENTION

Frequency domain, pulse compression CW (continuous wave) radar apparatus, according to the present invention, is configured for eliminating clutter signals and for obtaining range and doppler cell data from other return signals, for example, target returns. Comprising the frequency domain pulse compression radar are means for providing CW signals at a radio frequency, $f_{RF}$, and at an intermediate frequency, $f_{IF}$; means for providing a sawtooth, linear frequency modulation (LFM) ramp signal having a variable ramp frequency, $f_{LFM}$; means for combining the $f_{LFM}$ signal with the $f_{RF}$ signal to thereby provide a CW radar signal having a frequency, $(f_{RF}+f_{LFM})$, and means for transmitting the CW $(f_{RF}+f_{LFM})$ radar signal. The radar of the present invention further includes means for receiving time-delayed CW radar return signals reflected from clutter at a clutter range and reflected from a target at a target range and means for downconverting the time-delayed return clutter and target signals to thereby provide intermediate frequency, time-delayed clutter and target return signals for processing.

Means are provided for extracting the $f_{LFM}$ signal from the time-delayed clutter and target return signals to provide, in a frequency-time domain, a first, analog, rectangular wave signal corresponding to the reflected clutter signal from the clutter range and a second, analog, rectangular wave signal corresponding to the reflected target signal from the target range, the frequencies of both the first and second rectangular wave signals being related to the ranges from which the return signals are reflected and the relative velocities of the clutter and target relative to the radar. Filtering means, connected for receiving the first and second rectangular wave signals, have at least one frequency notch for substantially filtering out the first rectangular wave clutter signal while passing the second rectangular wave target signal, provided that, as is most usually the case, the frequency characteristics of the second rectangular wave target signal are different from the frequency characteristics of the first rectangular wave clutter signal. Signal processing means are included in the radar for receiving the second rectangular wave target signal output from the filtering means and for the processing of such signal to provide conventional target range and doppler cell data. In the preferred embodiment, the filtering means include means for adjusting the frequency of the filtering notch to thereby enable the filtering means to filter out the first rectangular wave clutter signal regardless from what range the clutter is reflected.

When the first rectangular wave clutter signal is associated with short range clutter, the clutter signal includes, at the beginning of each rectangular pulse thereof, a short time interval in which the frequency of the signal is substantially different from the intermediate frequency, the pulse beginnings corresponding to the start of each LFM sweep. During the remainder of each pulse, the frequency of the first rectangular wave clutter signal is not substantially different from the intermediate frequency. There are, for such cases, included means for substantially eliminating the short time intervals of substantial frequency difference before the first rectangular wave clutter signal is provided to the notch filtering means. Preferably, time gating means are provided for blocking passage of the first rectangular wave clutter signal during the short time intervals of substantial frequency difference, the gating means permitting remaining portions of the first wave clutter signal to pass to the notch filtering means during the rest of each signal period. Since the frequency difference between major portions of the second rectangular wave clutter signal and the IF frequency is about equal to a particular delta frequency, the filter notch for filtering out the short range clutter signal is selected to have a frequency notch that extends between about the IF frequency and a frequency that is slightly greater than the sum of the delta frequency and the IF frequency.

It is also preferred that the processing means include a first Fast Fourrier Transform (FFT) circuit connected for receiving the output of the notch filtering means and a second FFT circuit connected for receiving the output of the first FFT circuit. The processing means further preferably include a synchronization detector for providing in phase (I) and quadrature (Q) analog signal components of the second rectangular wave target signal output of the filtering means, analog to digital (A/D) converting means for converting the I and Q analog signal components to a digital format and means for sampling each of the digitized I and Q signal components a preselected number, M, of times during each signal period, T; and wherein the number M is an integer power of 2. According to the preferred embodiment, the first FFT circuit is an M-point type and the digitized samples of the I and Q components of the first wave signal are provided to corresponding inputs of the first FFT circuit.

When, as is preferred, the second rectangular wave target signal is processed in signal blocks of N signal pulses (wherein N is also an integer power of 2), with each pulse corresponding to one of the LFM ramps and having the period, T, the second FFT circuit is an N-point type. In such case, the first FFT circuit provides N vector outputs to corresponding inputs of the second FET circuit. The sample number M may be equal to the number N.

The first FFT circuit preferably provides digital pulse compression and the second FFT circuit provides signal doppler compression. The first FFT circuit and the second FFT circuit may comprise the same FFT circuit which provides digital pulse compression during a first phase (pass) of operation and signal doppler processing during a second phase (pass) of operation, the signal output from the FFT circuit at the end of the first phase being fed back to the input of the circuit for doppler processing during the second operational phase.

BRIEF DESCRIPTION OF THE DRAWINGS

A better understanding of the present invention may be had from the following detailed description when taken in conjunction with the accompanying drawings in which:

FIG. 1 is a top level functional block diagram of an exemplary CW (continuous wave) radar, in accordance with the present invention, which is configured for the rejection of radar return signals from clutter;

FIG. 3 is a diagram in which a LFM (linearly frequency modulated) CW RF (radio frequency) radar signal, ($f_{RF}+f_{LFM}$), transmitted by the radar of FIG. 2 is plotted in the frequency VS time domain, showing the sawtooth characteristics of the transmitted signal;

FIG. 4 is a diagram in which exemplary IF (intermediate frequency) down-converted, time-delayed radar return signals, of nominal frequency ($f_{IF}+f_{LFM}$), reflected from short range clutter and a longer range target are plotted in the frequency VS time domain, with the down-converted transmitted signal also shown for reference purposes, the diagram showing the time-delayed, sawtooth characteristics of the plotted signals;

FIG. 5 is a diagram in which the signals depicted in FIG. 4 are plotted in the frequency VS time domain after the signals have been mixed with the LFM signal to remove the LFM portion of the signals and provide a time-delayed, rectangularly-shaped IF signal, $f_{IF}$;

FIG. 6 is a diagram showing characteristics of a time gate circuit used in the radar of FIG. 1, FIG. 6a showing configuration of the time gate and FIG. 6b showing an off-on VS time plot of the time gate;

FIG. 7 is a diagram depicting, in the frequency VS gain domain, characteristics of a notch filter portion of the present invention which substantially eliminates the short range clutter return while passing the longer range, target data;

FIG. 8 is a plot in the frequency VS time domain showing the output signal from the time gate of FIG. 6;

FIG. 10 is a diagram depicting a variation notch filter having two frequency notches, FIG. 10a depicting, in the frequency-time domain, a mid-range clutter signal to be eliminated and FIG. 10b depicting the corresponding notch frequency locations of the notch filter.

DESCRIPTION OF THE PREFERRED EMBODIMENT

Figure 2:
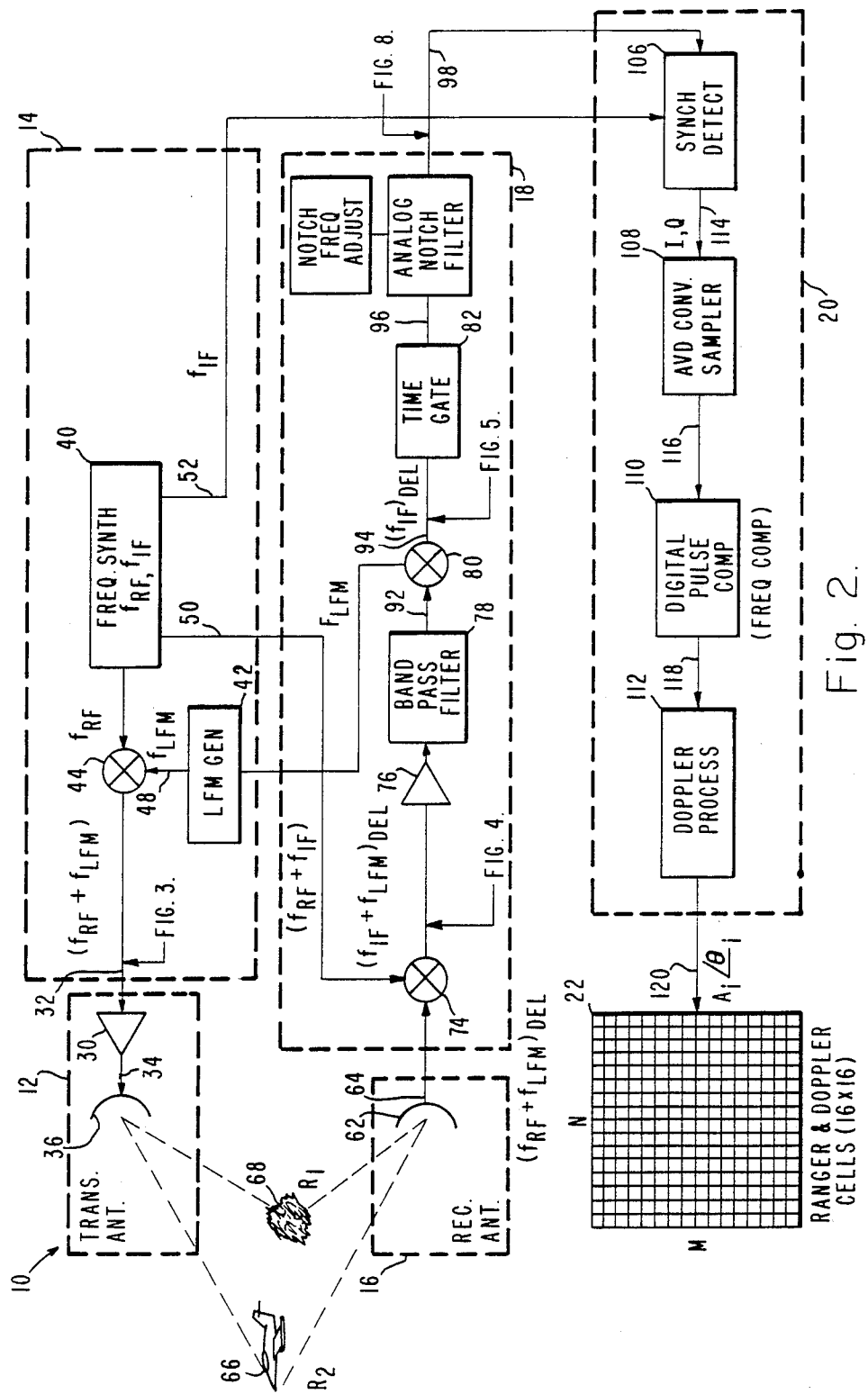
FIG. 2 is a second level functional block diagram of the CW radar of FIG. 1 showing in more detail the configuration thereof.

In general, the present invention employs novel frequency domain, pulse compression of return radar signals to enable a CW (continuous wave) radar to discriminate targets at one range or ranges from clutter at a different range. For purposes of illustrating the present invention, with no limitations thereby intended or implied, short range clutter and a mid-range target are assumed as objects detected by the radar. However, as described below, the clutter and target or targets may be at any range or ranges.

According to the present invention, as also more particularly described below, linear frequency modulation (LFM) techniques are applied to an RF (radio frequency) CW transmit signal to enable the elimination of the clutter return signal before the remaining target return signals are digitally processed to obtain conventional range and doppler cell information relating to target location and velocity.

For purposes of describing the present invention, the terms "CW" and "continuous wave" as used herein are considered to have the usual and accepted meanings pertaining to radars, it being appreciated that all "continuous wave" signals are not necessarily continuous at all times. Furthermore, the term "clutter" as used herein applies to any and all unwanted radar return signals, for example, return signals from the ground or rain. The term may, however, also include returns from specific objects, such as buildings, for which signal processing is not desired.

An exemplary CW radar 10 embodying the present invention is depicted in general or top level block diagram form in FIG. 1. Shown comprising radar 10 are transmitting means 12, frequency generating means 14, receiving means 16, clutter signal eliminating means 18, target signal processing means 20 and range and doppler cell data means 22. Described generally and functionally, frequency generating means 14 generate or provide CW signals at both a preselected RF (radio frequency) and at a preselected IF (intermediate frequency), such signals being herein identified respectively as $f_{RF}$ and $f_{IF}$ signals. In addition to providing the $f_{RF}$ and $f_{IF}$ signals, frequency generating means 14 provide a sawtooth (ramped) LFM signal, $f_{LFM}$.

More specifically, frequency generating means 14 provide: (i) a LFM modified RF signal, herein defined as $(f_{RF}+f_{LFM})$, to transmitting means 12, (ii) a $L_{FM}$ signal, $f_{LFM}$, and a combined RF and IF signal, herein defined as $(f_{RF}+f_{IF})$, to clutter signal eliminating means 18, and (iii) an IF signal, $f_{IF}$, to processing means 20. Receiving means 16, in turn, provide time-delayed, radar return signals, herein defined by the nominal frequency $(f_{RF}+f_{LFM})_{DEL}$, to clutter signal eliminating means 18.

Clutter signal eliminating means 18 operate to completely, or at least substantially, eliminate short range (for the present illustrative example) clutter portions of the nominal frequency $(f_{RF}+f_{LFM})_{DEL}$ signal and to thereby provide a "target only" IF signal, herein defined as $(f_{IF})_{DEL}$, to processing means 20. Within processing means 20 the analog $(f_{IF})_{DEL}$ signal is A-D (analog to digital) converted and is further processed to provide vector range and doppler cell information to range and doppler cell means 22 for use in target evaluation, as is well known to those skilled in the radar art.

Still more particularly, a second level functional block diagram of radar 10 is shown in FIG. 2. Transmitting means 12 are therein depicted as comprising a conventional amplifier 30 which receives, over a conduit 32, the $(f_{RF}+f_{LFM})$ signal from frequency generating means 14. Amplifier 30 provides an amplified $(f_{RF}+f_{LFM})$ signal, over a conduit 34, to a conventional antenna 36 which radiates the signal from radar 10.

Shown in FIG. 2 as comprising frequency generating means 14 are a conventional frequency synthesizer 40, which provides the $f_{RF}$ and $f_{IF}$ signals; a conventional LFM signal generator 42, which provides the sawtooth, $f_{LFM}$ signal; and a first, conventional signal or frequency mixer 44. As illustrated, frequency synthesizer 40 provides a $f_{RF}$ signal to mixer 44 over a conduit 46 and LFM signal generator 42 provides a $f_{LFM}$ signal to the same mixer over a conduit 48. In response to receiving such signals, mixer 44 provides the mixed transmitter signal, $(f_{RF}+f_{LFM})$, over conduit 32 to amplifier 30. The sawtooth configuration of the $(f_{RF}+f_{LFM})$ signal is depicted in FIG. 3, which shows that the LFM sawtooth portion portion of the signal starts ramping up at time $t_0$ and is periodically repeated at times $t_1$, $t_2$, $t_3$, and so forth for N times for each repetitive block of LFM signals. With no limitations intended or implied, the LFM repetition rate may be about 30 KHz. Frequency synthesizer 40, in addition, provides the combined, down-converting frequency signal, $(f_{RF}+f_{IF})$, over a conduit 50, to clutter eliminating means 18 and the IF signal, $f_{IF}$, to signal processing means 20 over a conduit 52. LFM generator 42 also provides the $f_{LFM}$ signal, over a conduit 54, to clutter eliminating means 18, for use as described below.

Receiving means 16, as further seen from FIG. 2, comprise a conventional receiving antenna 62 which provides to clutter elimination means 18, over a conduit 64, time-delayed, radar CW return signals, identified as $(f_{RF}+f_{LFM})_{DEL}$, having a nominal frequency, $(f_{RF}+f_{LFM})$, which may vary slightly in frequency due to well known doppler effects associated with moving objects. Such time-delayed signal typically comprises intermixed return signals from various reflecting objects and, for purposes of illustrating the present invention, is considered to comprise radar signal reflections from a target 66 at range R2 and from clutter (identified by reference number 68) at a shorter range $R_1$. As can be appreciated, however, the time-delayed return signal, $(f_{RF}+f_{LFM})_{DEL}$, may, more typically, comprise several different signal reflections from several different target objects at various ranges, and clutter returns may be received from more than one range.

Clutter eliminating means 18, described in greater detail below, comprise a second, conventional mixer 74; a conventional amplifier 76; a conventional band pass filter 78; a third, conventional mixer 80; a timing gate 82 and an analog notch filter 84. Second mixer 74 is connected by respective conduits 50 and 64 for receiving both the $(f_{RF}+f_{IF})$ signal from frequency synthesizer 40 and the time-delayed $(f_{RF}+f_{LFM})_{DEL}$ signal from receiving antenna 62 and, in response thereto and in a known manner, for providing to amplifier 76, over a conduit 96, an intermediate frequency signal, $(f_{IF}+f_{LFM})_{DEL}$, of nominal frequency $(f_{IF}+f_{LFM})$, from which the RF signal, $f_{RF}$, has been extracted and to which the $f_{IF}$ signal has been added. This intermediate frequency signal, $(f_{IF}+f_{LFM})_{DEL}$, is more particularly discussed below in connection with a discussion of FIG. 5.

After being conventionally amplified in amplifier 76, the $(f_{IF}+f_{LFM})_{DEL}$ signal from mixer 74 is band pass filtered in filter 78 (in a known manner), the filtered signal being fed, over a conduit 92, into third mixer 80. Such mixer 80 also receives the LFM signal, $f_{LFM}$, over conduit 54, from LFM generator 42. In response, mixer 80 outputs, to time gate 82 over a conduit 94, a time delayed signal of the nature shown in FIG. 5, and which is also more particularly discussed below in conjunction with the discussion of FIG. 5. From time gate 82, which eliminates, by time-delayed "turn on" or conduction of the gate, frequency spikes or dips, for example, at the beginning of each LFM ramp for the clutter signal, the gated signal is provided, over a conduit 96, to analog notch filter 64. As more particularly described below in connection with FIG. 6, analog notch filter 64 is configured for filtering out of the signal provided by time gate 82 specific frequencies associated with clutter 68. Those portions of the signal from time gate 82 that are associated with non-clutter return signals, for example, return signals from longer range target 66, are, however, passed through notch filter 64 and are provided, over a conduit 98, to signal processor means 20 (FIG. 2).

Shown in FIG. 2 as generally comprising signal processor means 20 are a synchronization detector 106, an A/D (analog to digital) converter and sampler 108, a digital pulse compressor 110 and a doppler processor 112, all of which are connected in electrical series in the stated order and all of which are of known design. Digital pulse compressor 110 and doppler processor 112 may each comprise a conventional FFT or DFT (Fast Fourier Transform or Discrete Fourier Transform) circuits, as are well known in the digital signal processing art.

The filtered analog signal from notch filter 64, which includes range and doppler information relative to target 66, is provided to an input of synchronization detector 106 over conduit 98. Also provided to an input of synchronization detector 106, over conduit 52, is the IF signal, $f_{IF}$, from frequency synthesizer 40. In response to such signals, synchronization detector 106 provides, over a dual output conduit 114, I (in phase) and Q (quadrature) analog signal components to A/D converter and sampler 108. The function of A/D converter and sampler 108 is to digitize the I and Q analog signal components and to sample each digitized I and Q signal M times (wherein M is an integer power of 2) each LFM period, T, (for an exemplary total of 2M signal samples for each of the N pulses per sample block).

These digital I and Q signal components samples are provided, over a conduit 116, to digital pulse compressor 110, which preferably comprises an "M-point" FFT. The M sets of N outputs from digital pulse compressor 110 are provided, over a conduit 118, to doppler processor 112, which may be an "N-point" FFT. From doppler processor 112, the M sets of N values representing, in a conventional manner, range and doppler cell "weights" are provided, over a conduit 120 to range and doppler cell means 22. Comprising range and doppler cell means 22 may be a conventional display (not shown) used for such purposes or a microprocessor memory (also not shown) into which the range and doppler cell information is entered for automated processing, in a known manner.

With further respect to FIG. 3, the CW transmitted signal, identified as $(f_{RF}+f_{LFM})$, has been described above as comprising a linear frequency modulation of the RF CW signal provided by frequency synthesizer 40. CW transmit signal, $(f_{RF}+f_{LFM})$, thus linearly increases in frequency, and then sharply drops in frequency, at regular time intervals of period, T, thereby causing the signal to have a "chirp" characteristic. As shown, the signal $(f_{RF}+f_{LFM})$ starts ramping up at times $t_0, t_1, t_2, \ldots, t_{N-1}$, the transmit signal, as mentioned above, being divided into blocks of N periods, T, or CW signal chirps, wherein N is also an integer power of 2.

Radar signal reflections, received by receiving antenna 62 (FIG. 2), of the transmit signal, $(f_{RF}+f_{LFM})$, are, as is well known, typically caused by targets or objects at various ranges. The resulting, time-delayed return signal, which may be generally identified as $(f_{RF}+f_{LFM})_{DEL}$ (with the recognition that such frequency is nominal), is, therefore, generally a composite of several (or many) overlappingg individual time-delayed signals that have been delayed for different lengths of time according to the associated reflection range. Although, overlapping, time-delayed CW signals can ordinarily be separated from the intermixed return signal by known techniques, range information cannot readily be extracted from uniform (non-modulated) CW signals.

In the present case, it can, however, be seen from the frequency VS time plot of FIG. 4, that the sawtooth portion of each separate reflected signal, comprising the intermixed (composite) return signal received by receiving antenna 62, is displaced or offset along the time axis, relative to the transmit (zero range) signal, by an amount related to the associated signal range. For illustrative purposes, FIG. 4 depicts the return signals and the zero range transmit signal (which may represent signal spill-over from transmitter means 12) after down converting, in mixer 74, to an intermediate frequency more readily adapted for signal processing, the time delay signal at this point being generally identified as $(f_{IF}+f_{LFM})_{DEL}$ (with the recognition that this is also a nominal frequency). Also to be consistent with the above description, FIG. 4 shows a plots of the first, time-delayed signal that is associated with the exemplary short range clutter 66 and a second, longer time-delayed signal that is associated with the exemplary mid-range target 68.

It should also be understood that although the short range ($R_1$) and mid range ($R_2$) signals are shown in FIG. 4, for convenience and merely by way of a simple, illustrative example, as being invariant over the N signal chirps or periods, T, comprising a signal block, such is ordinarily not the case and will only result from stationary objects with a stationary radar 10. Because the signal ramp starting points along the time axis relate to target range, and also to velocity in the more general case of moving targets and/or radar, the sawtooth portions of the return signals will, for moving targets or radar, be shifted at least slightly along the time axis for different ones of the N periods.

Very importantly, it can be appreciated from FIG. 4 that the respective frequency differences, $\Delta f_1$ and $\Delta f_2$, between the exemplary short range and mid range reflected signals and the zero range (spill-over) signal, at any selected time, ti, on the time axis are also related to the ranges from which the signals are reflected (and also to target or radar velocity).

In the present case, the time-delayed return signals depicted in FIG. 4 are amplified in amplifier 76, are conventionally filtered in band pass filter 78, and are mixed, in mixer 80, with the $f_{LFM}$ signal from LFM generator 42 to provide signals having the rectangular (instead of sawtooth) frequency VS time characteristics depicted in FIG. 5. As seen from FIG. 5, after the LFM signal corresponding to the zero range ($R_0$) return or spillover is removed in mixer 80 from the short range ($R_1$) clutter return signal, the resulting signal has, each time period, T, a short time duration frequency region in which the frequency is nearly a full bandwidth below the IF axis. During the rest of each period, T, the short range signal has a frequency region wherein the frequency is only slightly above the IF axis.

In contrast, the mid range ($R_2$) target signal from which the zero range LFM compoment has been removed in mixer 80, has, as shown by FIG. 5, about a half period time duration frequency region during which the frequency is approximately a half bandwidth below the IF axis. During the remainder of each period, the frequency of the mid range target signal is approximately a half bandwidth above the IF axis.

By these two examples, it can be appreciated that as the return signal range increases, the time duration that the frequency is below the IF axis increases and the negative frequency difference between the signal and IF decreases; also, the time duration of the signal above the IF axis decreases and the positive frequency difference between the signal and IF increases. Accordingly, for example, a long range return signal (shown in phantom lines in FIG. 5) will be approximately the inverse of the short range return signal. However, irrespective of the range from which the return signals are reflected, or the relative target and radar velocity, the peak-to-peak frequency difference of any signal (represented in FIG. 5) returned from any object is always the same for all return signals and is always equal to the IF frequency bandwidth. This is an important characteristic of the rectangular wave signals depicted in FIG. 5 and makes possible the subsequent processing thereof to obtain range and doppler cell data.

Target and/or radar velocity has a doppler effect on the frequency levels of the short, mid and long range return signals (as well as of other return signals from other ranges) depicted in FIG. 5. Thus, for targets moving at a relative velocity, +V, towards receiving antenna 62, the frequency levels of the signals plotted in FIG. 5 will be shifted upwardly and for targets moving away from the receiving antenna at a relative velocity, −V, the frequency levels will be shifted downwardly, the amount of upward or downward frequency shifting being respectively related to the velocities +V and −V.

The exemplary short range clutter signal is eliminated by time gate 82 (or its equivalent) and by notch filter 64. As shown in FIG. 6, time gate 82 may comprise an electronic switch that remains turned off to block the signal for the brief time, Δt, at the beginning of each period, T, that the short range signal frequency is substantially below the IF axis. During the remainder of each period, T, time gate 82 is turned on to permit the rest of the short range signal, as well as the rest of any other signals, to pass therethrough. As an alternative to time gate 82, a conventional amplitude weight circuit (not shown) may be used to screen out the short duration frequency "dip" region of the short range clutter signal at the beginning of each period, T. Time gate 82 may alternatively be configured for gating off other undesirable, short frequency regions of the return signals, for example, the high frequency, end portion of the long range clutter signal depicted in FIG. 5.

Notch filter 64 has the general characteristics depicted in FIG. 7 and is configured, in order to filter out short range clutter, having a high signal attenuation frequency "notch" 130 that extends from the IF frequency to slightly beyond the frequency, (IF +Δf). As a result, the remaining portion of the short range clutter signal, which has a frequency equal to (IF+Δf), is greatly attenuated and is thereby filtered out. Other signals, for example, those from ranges greater than the short range, R1, are outside the narrow frequency range of notch 130 and are, therefore, not filtered out by the filter 64.

It can be appreciated that for some combinations of target range and velocity, during some chirp periods a target return signal may have the same or approximately the same frequency characteristics of those of the stationary clutter return signal. This is because the doppler effect of a moving target causes (as above-described) the frequency signal depicted in FIG. 5 to shift upwardly or downwardly. As a result, it is possible that during some signal periods, T, a target return signal may be filtered out, along with the clutter return signal, by notch filter 40. However, because of changing target range due to target velocity, this simultaneous filtering of target and clutter return signals would be expected to be only a transitory condition which would result in the loss of only minimal amounts of target information.

The remaining target signal provided at the output of notch filter 64 is depicted in the frequency VS time plot of FIG. 8. Although it appears that this target signal might readily be processable by conventional techniques, such is not, in fact, the case because range and doppler effects on the signal cannot easily be separated. Consequently, the present inventor has determined that special processing of the notch-filtered signal or signals, by digital pulse compressor 110 and doppler processor 112, is needed to obtain range and doppler cell data of the type ordinarily provided by conventional radars. Such processing is particularly important in the more general case wherein the signals are shifted, from period to period, along the time and/or frequency axes due to range changes and target velocity.

From analog notch filter 64, the generally rectangular target signal, in this case a mid-range signal as depicted in FIG. 8, is provided, over conduit 98, to synchronization detector 106. Also provided to detector 106, over conduit 52, is the IF signal, identified as $f_{IF}$, from frequency synthesizer 40. As described above, synchronization detector 106 provides, in a known, conventional manner, the I and Q analog return signal components necessary for the subsequent determination of range and doppler cell data. From detector 106, the I and Q analog signal components of the mid-range return signal are provided, over conduit 114, to A/D converter and sampler 108.

Figure 9:
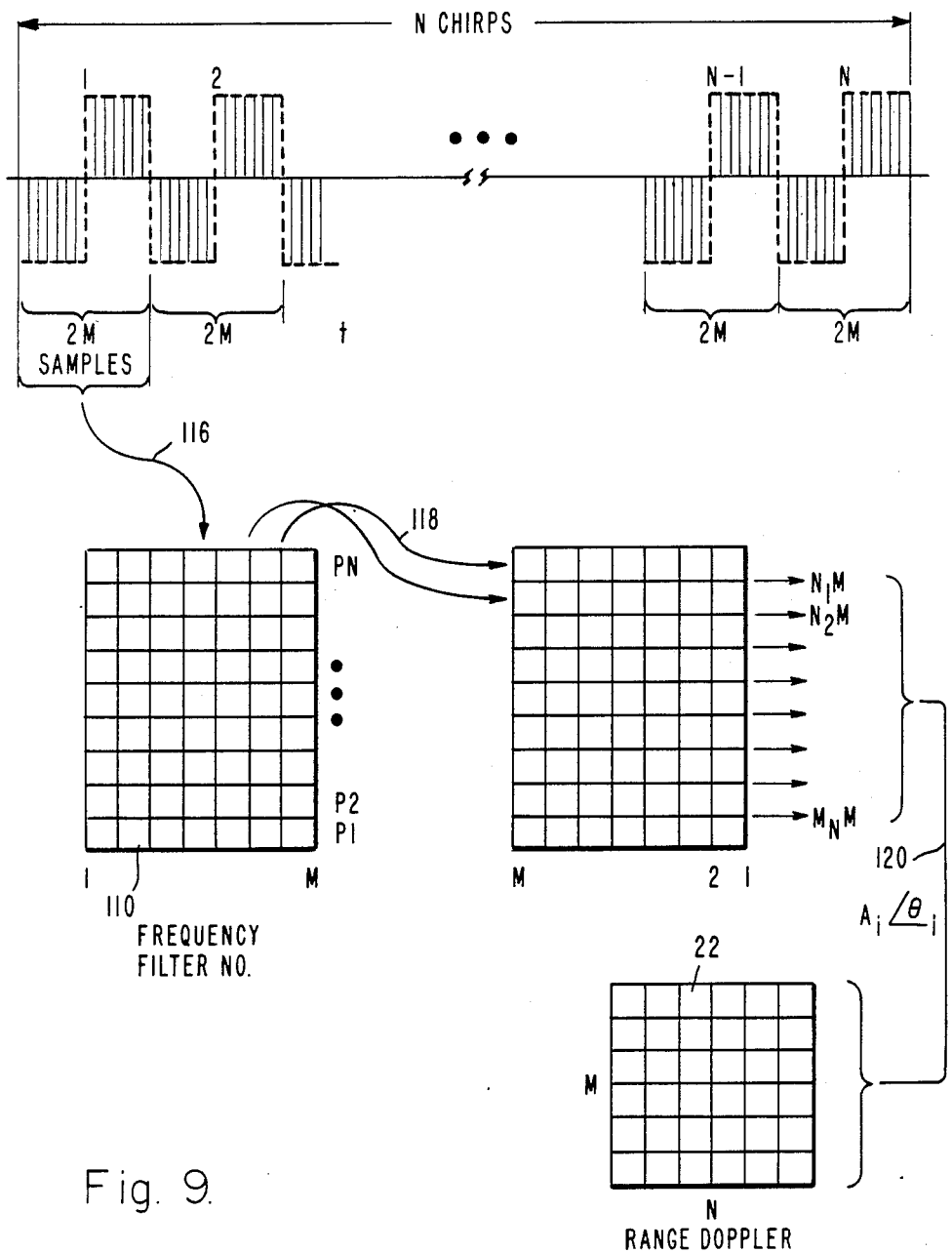
FIG. 9 is a schematic drawing of signal processing portions of the radar of FIG. 1 showing the sampling of signal data and the processing thereof for range and doppler cell portions of the radar.

Within A/D converter and sampler 108, the analog I and Q target (mid-range) signal components are conventionally converted to digital form and the digital signal is sampled for subsequent processing. As previously mentioned and as depicted in FIG. 9, each of the N signal chirps in each block of signals is sampled 2M times (M times for each of the I and Q components). Accordingly, for each signal block there exists (in the preferred embodiment described herein) 2M*N signal samples from which data for M*N range and doppler cells is subsequently derived. These digital signal samples are provided, over conduit 116, to digital pulse compressor 110, which is preferably an M-point FFT, as is well known to those skilled in the radar art. The 2M I and Q signal samples (that is, M vector samples) are fed into corresponding inputs of pulse compressor 110 for each of the N pulses in a block. In response thereto, pulse compressor 110 provides M*N vector outputs, over conduit 118, to doppler processor 112. Comprising doppler processor 112 is preferable an N-point FFT similar to that used for digital pulse compressor 110. In response to the M*N vectors being applied to corresponding inputs of doppler processor 110, the doppler processor provides, over conduit 120 to range and doppler cell means 22, N*M vector outputs of the form $A_i \angle \theta_i$. In range and doppler cell means 22, the $A_i \angle \theta_i$ data are appropriately assigned or plotted in corresponding ones of the N×M cell matrix.

Provided that M is equal to N, as may be preferred, the operations of digital pulse compressor 110 and doppler processor 112 may be combined in a single M-point FFT, the initial, pulse compression output being fed back through the FFT, the second pass through the FFT providing the doppler compression.

Throughout the above description of radar 10, it has been considered, solely by way of example and not of limitation, that the clutter signal to be eliminated is short range clutter. As a result, notch filter 64 was described (and shown in FIG. 7) as incorporating filtering notch 130 which has a relatively narrow frequency width, Δf, beyond the IF frequency. This Δf width of notch 130 is selected to filter out (attenuate) those major portions of the short range clutter return signal that are separated in frequency from the IF axis by Δf (FIG. 5), while permitting the passing of other frequencies associated with other return signals for which processing is desired.

It can, however, be appreciated from an examination of FIGS. 5 and 7 that notch filter 84 can be alternatively be configured to filter out any return signal, or portion thereof, by the appropriate selection of the number of notches 130, the notch frequency center or frequency location and the notch frequency width. There is, therefore, depicted in FIG. 10, by way of further illustrating the present invention, a variation notch filter 84a which is particularly configured for filtering out the depicted mid range signal while permitting the depicted short range signal to pass through relatively unattenuated, it now being assumed that the clutter originates at mid range, $R_2$, rather than at short range, $R_1$, as was previously considered to be the case. Consider, therefore, that the mid-range signal to be eliminated has the rectangular shape, in the frequency-time domain, shown in FIGS. 5 and 10a (FIG. 10a showing applicable portions of FIG. 5). As indicated, such mid-range signal has, each period, an initial region 132 having a frequency, $f_L$, that is substantially below the IF axis. About halfway through each period, the clutter signal abruptly shifts upwardly up to to a region 134 that has a frequency $f_H$ which is substantially above the IF axis. Accordingly, to enable filtering out the mid range signal, notch filter 84a is configured having a lower frequency notch 136 centered at the frequency $f_L$ and a higher frequency notch centered at the frequency $f_H$. The respective frequency widths of filter notches 136 and 138, $\Delta f_L$ and $\Delta f_H$, are selected to assure filtering out of the mid-range clutter signal without significant filtering out of other, non-clutter signal frequencies. Notch filter 84a may comprise a single filter having two notches or may comprise two separate filters arranged in electrical series (as depicted in FIG. 10a).

Moreover, according to return signal frequencies (as plotted in the frequency-time domain of FIG. 5), the notch frequency or frequencies of notch filters 84 or 84a may, from time to time, need to be shifted in order to filter out the clutter signals, for example, as clutter ranges change. Ordinarily, the range from which the clutter signals are returned is apparent or known to the radar operator so that when the return signal depicted in FIG. 5 is displayed on a conventional CRT screen or similar display (not shown), the clutter return signal can be distinguished from other (target) signals. There may, accordingly, be operatively associated with notch filter 84, and also with time gate 82 if desired, a frequency adjusting and a time gate adjusting circuit 140 (FIG. 2) which enables manual or automatic adjusting of the notch frequency or frequencies to match those of the clutter signal and which may be configured to enable adjusting of the time gate on and off schedule. Although shown connected to notch filter 84 by a conduit 142, adjusting circuit 140 may be included as part of the notch filter or the time gate. A similar adjusting circuit may, of course, be provided for notch filter 84a.

Although there has been described above an embodiment of the frequency domain pulse compression radar apparatus for eliminating clutter returns in radar, and a varation of portions thereof, according to the present invention for the purpose of illustrating the manner in which the invention may be used to advantage, it is to be understood that the invention is not limited thereto. Accordingly, any and all variations or modifications that may occur to those skilled in the art are to be considered to be within the scope and spirit of the claims as appended hereto.

What is claimed is:

1. Frequency domain, pulse compression CW (continuous wave) radar apparatus, which comprises:
    (a) means for providing CW signals at a radio frequency, $f_{RF}$, and at an intermediate frequency, $f_{IF}$;
    (b) means for providing a sawtooth, linear frequency modulation (LFM) ramp signal having a variable ramp frequency, $f_{LFM}$, and means for combining the $f_{LFM}$ signal with the $f_{RF}$ signal to thereby provide a CW radar signal having a frequency, $(f_{RF}+f_{LFM})$;
    (c) means for transmitting the CW $(f_{RF}+f_{LFM})$ radar signal;
    (d) means for receiving time-delayed CW radar return signals which comprise reflections of said radar signal from clutter at a clutter range and from a target at a target range;
    (e) means for downconverting the time-delayed, clutter and target return signals received by the receiving means to said intermediate frequency for processing;
    (f) means for extracting the $f_{LFM}$ signal from the time-delayed, intermediate frequency clutter and target return signals to provide, in a frequency-time domain, a first, analog, rectangular wave signal corresponding to the reflected clutter signal from the clutter range and a second, analog, rectangular wave signal corresponding to the reflected target signal from the target range;
    (g) filtering means connected for receiving the first and second rectangular wave signals and having at least one frequency notch for filtering out said first rectangular wave clutter signal while passing the second rectangular wave target signal when the frequency characteristics of said first and second rectangular wave signals are different from one another; and
    (h) processing means connected for receiving the second rectangular wave target signal output from the filtering means and for the processing thereof to provide conventional target range and doppler cell data relating to target range and velocity.

2. The frequency domain pulse compression radar apparatus as claimed in claim 1, wherein the filtering means include means for adjusting the frequency of the filtering notch so as to enable the filtering means to filter out the first rectangular wave clutter signal according to the range from which the clutter is reflected.

3. The frequency domain pulse compression radar apparatus as claimed in claim 1 wherein the first rectangular wave clutter signal corresponds to short range clutter, the clutter signal including, at the beginning of each rectangular pulse of said first rectangular wave clutter signal, a short time interval in which the frequency of said clutter signal does not differ substantially from said intermediate frequency, the pulse beginning corresponding to the start of each LFM sweep, and including means for substantially eliminating said short time intervals of substantial frequency difference before the first rectangular wave clutter signal is provided to the notch filtering means.

4. The frequency domain pulse compression radar apparatus as claimed in claim 3 wherein the means for substantially eliminating said short time intervals of substantial frequency difference include time gating means for blocking passage of the first rectangular wave clutter signal during said short time intervals of substantial frequency difference and for permitting remaining portions of the first wave signal to pass to the notch filtering means during the rest of each signal period associated with said LFM sweep.

5. The frequency domain pulse compression radar apparatus as claimed in claim 1 wherein the processing means include a first Fourier Transform circuit connected for receiving the output of the notch filtering means and a second Fourier Transform circuit connected for receiving the output of the first Fourier Transform circuit.

6. The frequency domain pulse compression radar apparatus as claimed in claim 5 wherein the processing means include a synchronization detector for providing in phase (I) and quadrature (Q) analog signal components of the second rectangular wave target signal output of the filtering means, analog to digital (A/D) converting means for converting said I and Q analog signal components to a digital format and means for sampling each of the digitized I and Q signal components a preselected number, M, of times during each period, T, of said signal, wherein the first Fourier Transform circuit is of an M-point type and wherein the digitized samples of the I and Q components of the first wave signal are provided to corresponding inputs of the first Fourier Transform circuit.

7. The frequency domain pulse compression radar apparatus as claimed in claim 6 wherein the second rectangular wave signal is processed in signal blocks of N signal pulses, each said pulse corresponding to one of the LFM ramps and having the period, T.

8. The frequency domain pulse compression radar apparatus as claimed in claim 7 wherein both M and N are integer powers of 2.

9. The frequency domain pulse compression radar apparatus as claimed in claim 7 wherein the second Fourier Transform circuit is of an N-point type and wherein the first Fourier circuit provides N vector outputs to corresponding inputs of the second Fourier Transform circuit.

10. The frequency domain pulse compression apparatus as claimed in claim 9 wherein the sample number M is equal to the number of pulses N.

11. The frequency domain pulse compression radar apparatus as claimed in claim 5 wherein the first Fourier Transform circuit provides digital pulse compression and the second Fourier Transform circuit provides signal doppler compression.

12. The frequency domain pulse compression radar apparatus as claimed in claim 11 wherein the first Fourier Transform circuit and the second Fourier Transform circuit comprise the same Fourier Transform circuit which provides said digital pulse compression during a first phase of operation and which provides signal doppler processing during a second phase of operation, the signal output from the Fourier Transform circuit at the end of said first phase being provided to the input of said circuit for doppler processing during said second phase.

13. The frequency domian pulse compression radar apparatus as claimed in claim 5 wherein the first and second Fourier Transform circuits comprise Fast Fourier Transform circuits.

14. The frequency domain pulse compression radar apparatus as claimed in claim 1 wherein the clutter range is a short range as compared to the target range, wherein the frequency difference between major portions of the second rectangular wave clutter signal and the IF frequency is about equal to a particular delta frequency and wherein the filter notch for filtering out the short range clutter signal is selected to have a frequency notch that extends between about the IF frequency and a frequency that is slightly greater than said delta frequency above said IF frequency.

15. Frequency domain, pulse compression CW (continuous wave) radar apparatus, which comprises:

(a) means for providing CW signals at a radio frequency, $f_{RF}$, and at an intermediate frequency, $f_{IF}$;

(b) means for providing a saw tooth, linear frequency modulation (LFM) ramp signal having a variable ramp frequency, $f_{LFM}$, and means for combining the $f_{LFM}$ signal with the $f_{RF}$ signal to thereby provide a CW radar signal having a frequency, $(f_{RF}+f_{LFM})$;

(c) means for emitting the CW $(f_{RF}+f_{LFM})$ radar signal;

(d) means for receiving time-delayed CW radar return signals, comprising reflections of said radar signal from clutter at a clutter range and from a target at a target range;

(e) means for downconverting the time-delayed clutter and target return signals received by the receiving means to the intermediate frequency for processing;

(f) means for extracting the $f_{LFM}$ signal from the time-delayed, intermediate frequency, clutter and target return signals to provide, in a frequency-time domain, a first, analog rectangular wave signal corresponding to the reflected clutter signal from the clutter range and a second, analog rectangular wave signal corresponding to the reflected target signal from the target range;

(g) frequency notch filtering means connected for receiving the first and second rectangular wave signals and having at least one frequency notch for filtering out said first rectangular wave clutter signal while passing the second rectangular wave target signal when the frequency characteristics of the first and second signals are different from one another; and (h) processing means connected for receiving the second rectangular wave target signal output from the filtering means in blocks each of which has a predetermined number, N, of pulses, each pulse having a period, T, wherein the period T is the period of the LFM ramp, said processing means including means for providing, from said target signal pulses, in phase (I) and quadrature (Q) analog signal components; analog to digital converting means for converting the I and Q analog signal components into corresponding I and Q digital signal components; sampling means for sampling each of the I and Q component signal pulses a preselected number, M, of times; first Fourier Transform means connected for receiving the I and Q component samples for each signal pulse in each said block of pulses and for providing pulse compression thereof, and second Fourier Transform means connected for receiving the output of the first Fourier means and for the doppler processing thereof so as to provide conventional range and doppler cell information concerning said target.

16. The frequency domain pulse compression radar apparatus as claimed in claim 15 including means for adjusting the frequency location of the filtering means frequency notch so as to enable the fltering out of clutter signals at different ranges.

17. The frequency domain pulse compression radar apparatus as claimed in claim 15 wherein the clutter is short range clutter and wherein the first analog rectangular wave signal corresponding to the reflected clutter signal has, for each of said pulses, a short time interval, first frequency region during which the frequency is substantially less than the intermediate frequency and during the remaining time interval of each pulse has a second frequency region in which the frequency is closely above the intermediate frequency.

18. The frequency domain pulse compression radar apparatus as claimed in claim 17 including means connected for receiving the first analog rectangular wave signal and for eliminating therefrom said first frequency region before the first reatangular wave signal is provided to the frequency notch filtering means.

19. The frequency domain pulse compression radar apparatus as claimed in claim 15 wherein both the numbers N and M are integer powers of 2.

20. The frequency domain pulse compression radar apparatus as claimed in claim 19 wherein the numbers M and N are equal to each other.

* * * * *